(12) United States Patent
Park et al.

(10) Patent No.: US 11,967,066 B2
(45) Date of Patent: Apr. 23, 2024

(54) METHOD AND APPARATUS FOR PROCESSING IMAGE

(71) Applicants: DAEGU GYEONGBUK INSTITUTE OF SCIENCE AND TECHNOLOGY, Daegu (KR); MARQUETTE UNIVERSITY, Milwaukee, WI (US)

(72) Inventors: Sang Hyun Park, Daegu (KR); Dong Kyu Won, Daegu (KR); Dong Hye Ye, Atlanta, GA (US)

(73) Assignees: DAEGU GYEONGBUK INSTITUTE OF SCIENCE AND TECHNOLOGY, Daegu (KR); MARQUETTE UNIVERSITY, Milwaukee, WI (US)

( * ) Notice: Subject to any disclaimer, the term of this patent is extended or adjusted under 35 U.S.C. 154(b) by 419 days.

(21) Appl. No.: 17/227,611

(22) Filed: Apr. 12, 2021

(65) Prior Publication Data

US 2022/0327692 A1  Oct. 13, 2022

(51) Int. Cl.
*G06T 7/00* (2017.01)
*G06F 18/213* (2023.01)
*G06T 5/20* (2006.01)
*G06T 5/70* (2024.01)
*G06T 11/00* (2006.01)

(52) U.S. Cl.
CPC .......... *G06T 7/0012* (2013.01); *G06F 18/213* (2023.01); *G06T 5/20* (2013.01); *G06T 5/70* (2024.01); *G06T 11/005* (2013.01); *G06T 2207/10081* (2013.01); *G06T 2207/30101* (2013.01)

(58) Field of Classification Search
None
See application file for complete search history.

(56) References Cited

U.S. PATENT DOCUMENTS

| 2017/0193637 A1 | 7/2017 | Suzuki et al. |
| 2019/0108634 A1* | 4/2019 | Zaharchuk ............... G06T 5/50 |
| 2019/0142519 A1* | 5/2019 | Siemionow ............ A61B 34/30 |
| | | 600/408 |
| 2022/0036517 A1* | 2/2022 | Sandfort ................ G16H 30/40 |

FOREIGN PATENT DOCUMENTS

KR    10-2061967    1/2020

OTHER PUBLICATIONS

Korean written opinion 20210057342 (Year: 2022).*

(Continued)

*Primary Examiner* — Randolph I Chu
(74) *Attorney, Agent, or Firm* — LEX IP MEISTER, PLLC

(57) ABSTRACT

An image processing method of the present disclosure may include receiving a scanned image, and processing the received image through an octave convolution-based neural network to output a high-quality image and an edge image for the received image. The octave convolution-based neural network may include a plurality of octave encoder blocks and a plurality of octave decoder blocks. Each octave encoder block may include an octave convolutional layer, and may be configured to output a high-frequency feature map and a low-frequency feature map for the image.

20 Claims, 8 Drawing Sheets

(56) References Cited

OTHER PUBLICATIONS

Ren et al. "DA-CapsUNet: A Dual-Attention Capsule U-Net for Road Extraction from Remote Sensing Imagery" Remote Sens. 2020, 12, 2866; doi:10.3390/rs12182866 (Year: 2020).*
Abeßer et al. "Jazz Bass Transcription Using a U-Net Architecture", Electronics 2021, 10, 670. https://doi.org/10.3390/electronics10060670 (Year: 2021).*
Song et al. "Higher accuracy and lower complexity: convolutional neural network for multi-organ segmentation", SPIE International Symposium on Artificial Intelligence and Robotics (ISAIR), 2020, Kitakyushu, Japan (Year: 2020).*
Wang et al. "U2-ONet: A Two-Level Nested Octave U-Structure Network with a Multi-Scale Attention Mechanism for Moving Object Segmentation", Remote Sens. 2021, 13, 60. https://dx.doi.org/10.3390/rs13010060 (Year: 2021).*
Zhun Fan, et al:"Accurate Retinal Vessel Segmentation via Octave Convolution Neural Network", Electrical Engineering and Systems Science_Image and Video Processing, arXiv:1906.12193, Sep. 23, 2020(Sep. 23, 2020).
Xing Bai et al:"Parallel global convolutional network for semantic image segmentation", IET Image Processing, 2021 Wiley Online Library, vol. 15, Issue 1, Jan. 2021, pp. 252-259(Jan. 31, 2021).
Yunpeng Chen et al:"Drop an Octave: Reducing Spatial Redundancy in Convolutional Neural Networks with Octave Convolution", Proceedings of the IEEE/CVF International Conference on Computer Vision (ICCV), Oct. 27-Nov. 2, 2019, pp. 3435-3444(Oct. 27, 2019).
KIPO, Office Action of KR 10-2021-0057342 dated Apr. 22, 2022.
Shanshan Li et al., "Frequency Separation Network for Image Super-Resolution", IEEE Access, vol. 8, pp. 33768-33777, Feb. 10, 2020, doi: 10.1109/ACCESS.2020.297292.
Yang Chen et al., "Thoracic low-dose CT image processing using an artifact suppressed large-scale nonlocal means", Physics in Medicine and Biology, IOP Publishing, 2012, 57 (9), pp. 2667-2688.
Dong Kyu Won et al., "Low-Dose CT Denoising Using Octave Convolution with High and Low Frequency Bands", I. Rekik et al. (Eds.): PRIME 2020, LNCS 12329, pp. 68-78, 2020.

* cited by examiner

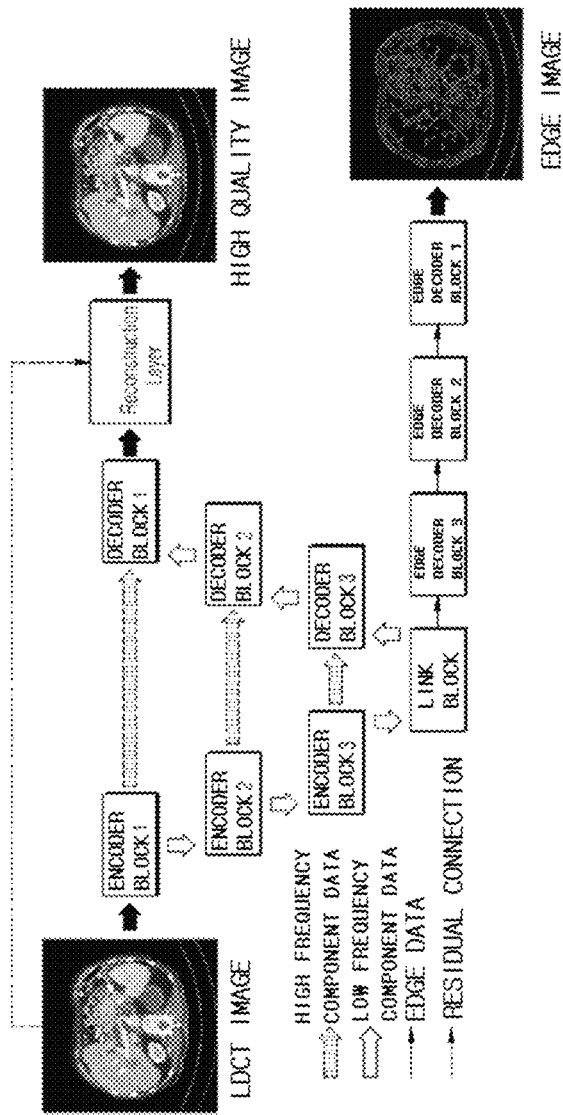
[FIG. 1]

[FIG. 2]
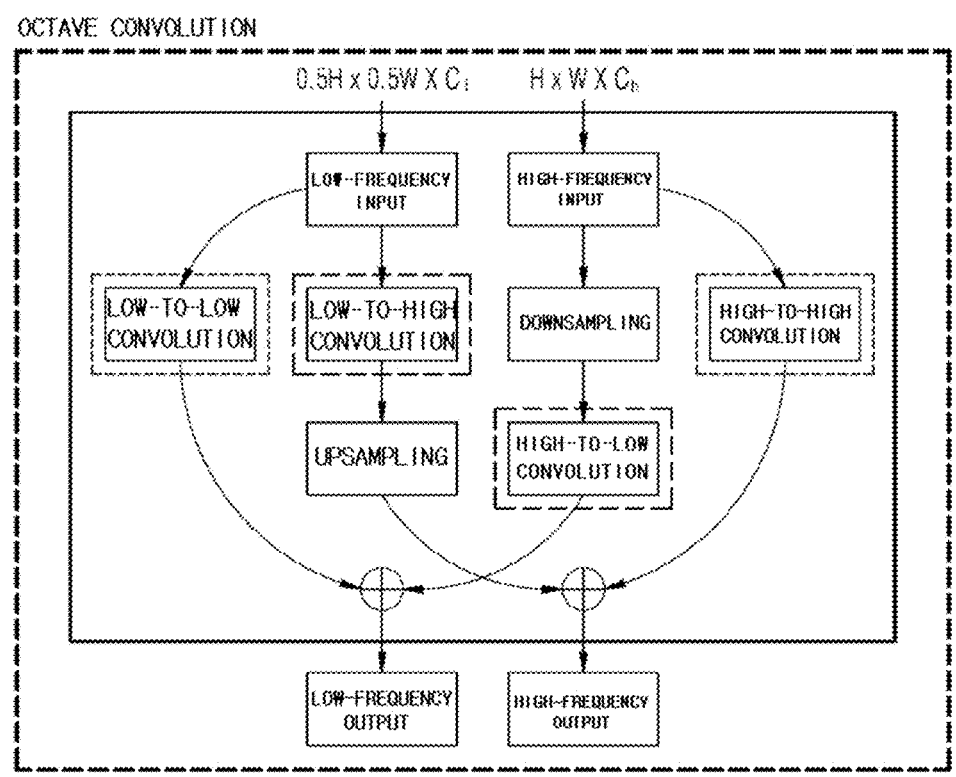

[FIG. 3]
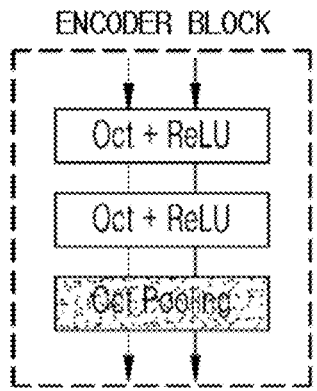
[FIG. 4]
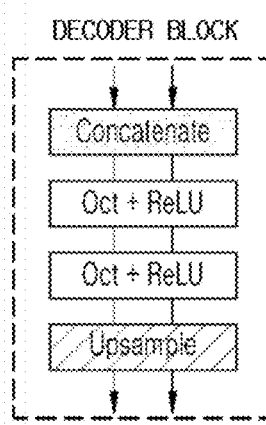
[FIG. 5]
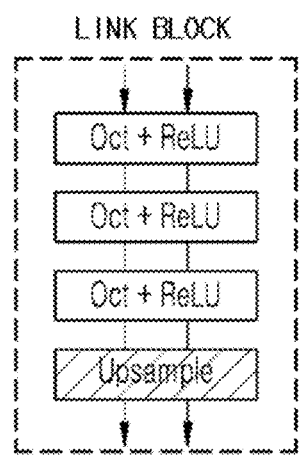

[FIG. 6]
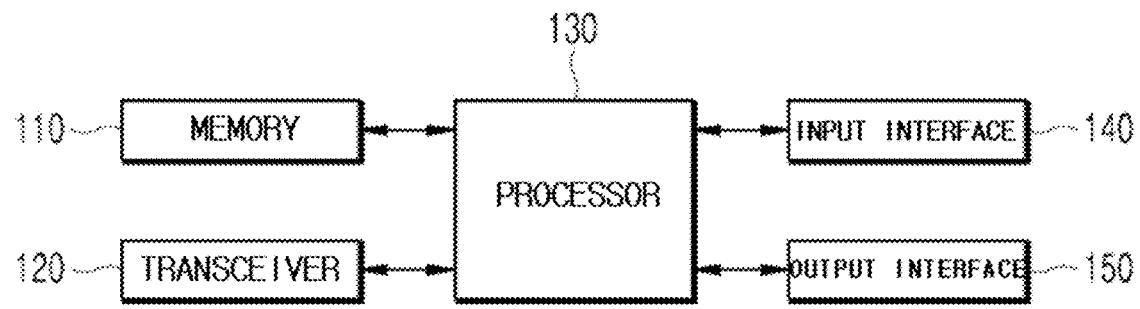
[FIG. 7]
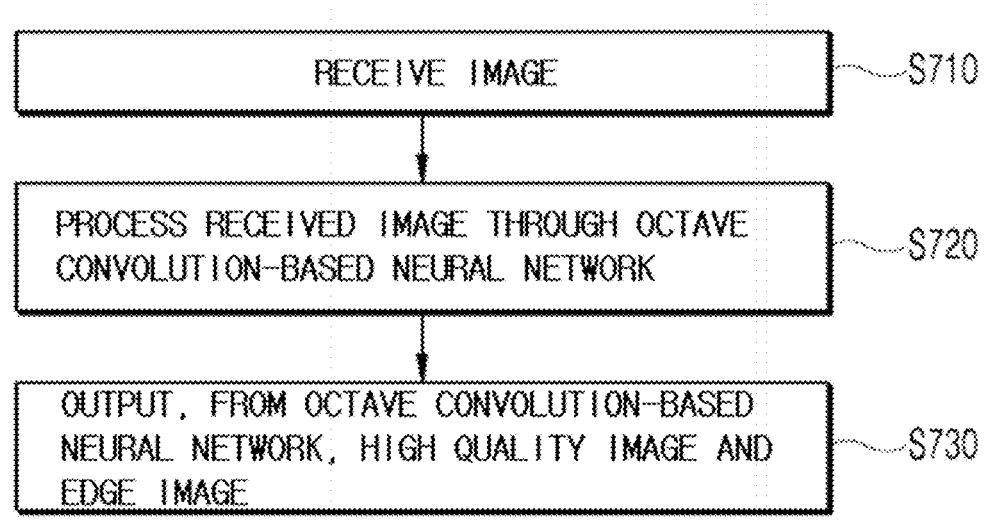

[FIG. 8]
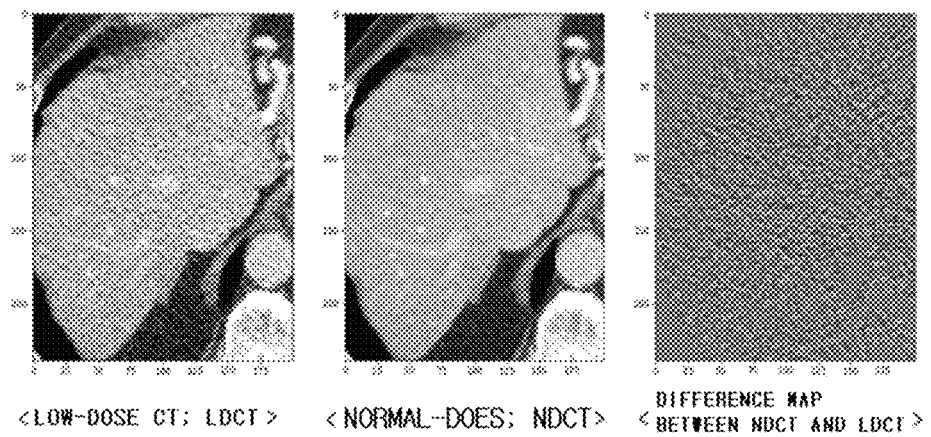

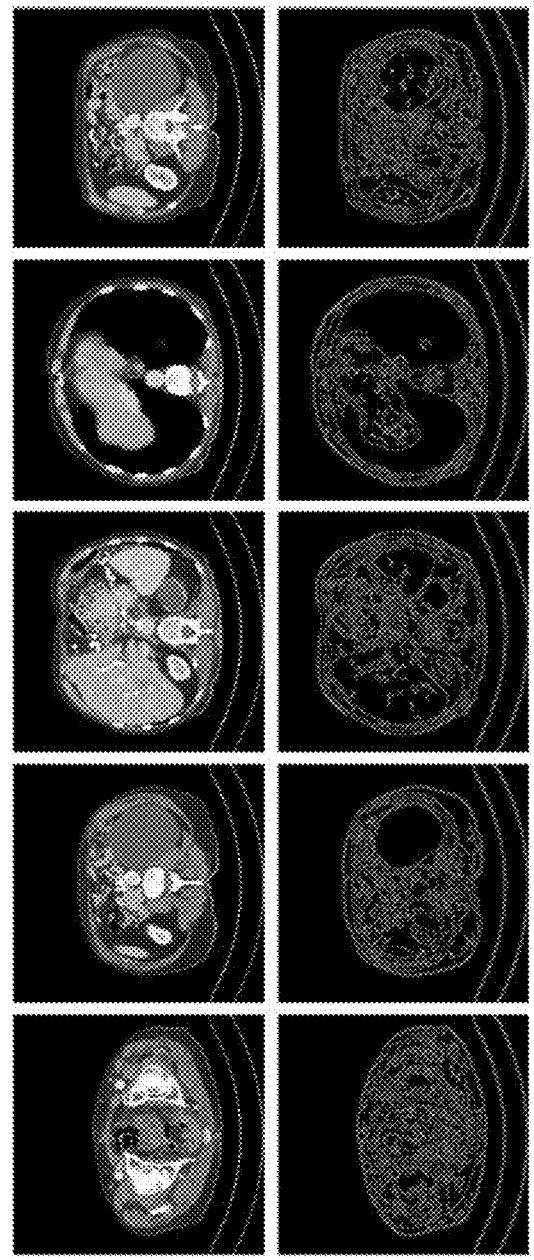
[FIG. 9]

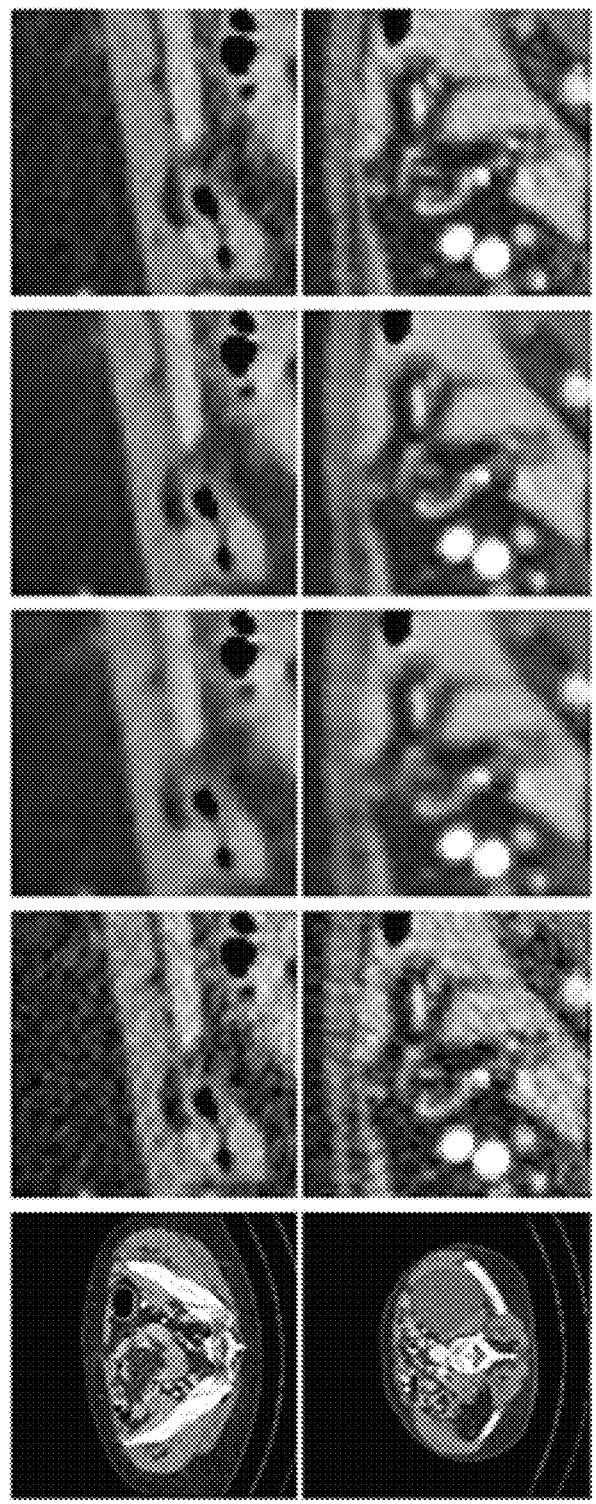

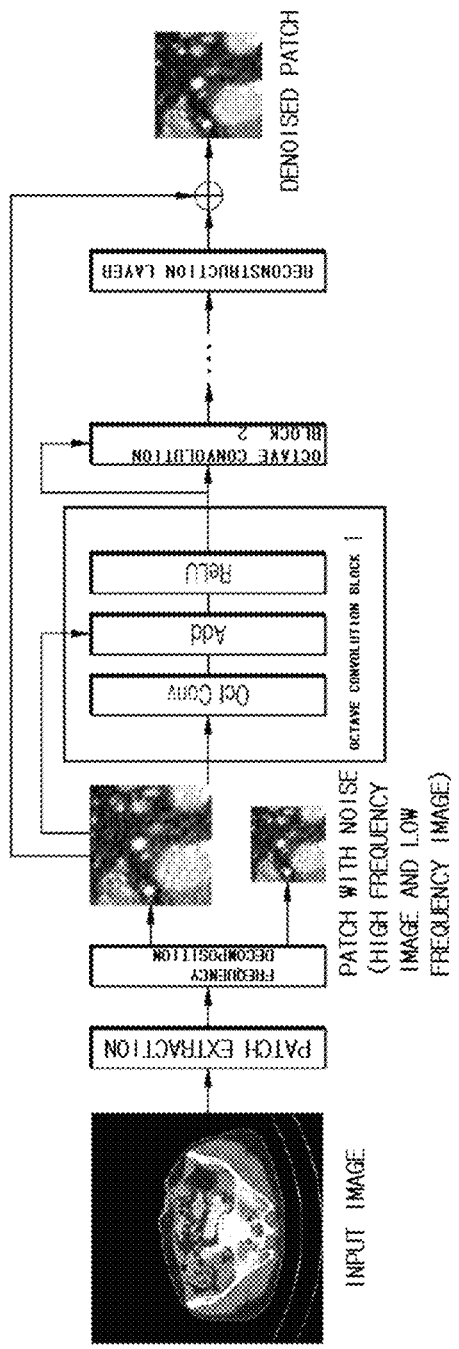
[FIG. 11]

METHOD AND APPARATUS FOR PROCESSING IMAGE

BACKGROUND

1. Technical Field

The present disclosure relates to an image processing method and apparatus, and more specifically, to an image processing method and apparatus for computed tomography (CT) denoising, capable of denoising a CT image using high-frequency and low-frequency mutual convolution.

2. Description of Related Art

In recent years, with the progression of the aging society phenomenon worldwide, the medical device market continues to grow in size. In particular, artificial intelligence technology is one of the core technologies of next-generation medical devices, and its research scale is expanding worldwide.

Meanwhile, in the global medical device market, the CT market is the second largest in size, after MRI. CT is one of the most widely used non-invasive imaging techniques for diagnosis, stage classification, disease detection, and the like. However, even with high availability, radiation from CT scans may potentially harm patients.

Accordingly, low-dose CT (LDCT) technology has been studied, and in particular, LDCT denoising technology has been studied to reduce radiation damage to patients. CT images may be obtained through the processes of tomography, sinogram signal acquisition, and CT image reconstruction. A sinogram is obtained by capturing projection data for each projection direction and sequentially arranging the projection data according to each projection direction, wherein pixel values of each row of the sequential arrangement are the same as the amplitude at a corresponding position of a corresponding profile.

LDCT scanners are being developed to reduce potential radiation damage to patients, but the LDCT scanners generate artifacts that cause diagnosis inaccuracies, and scanned LDCT images are of low quality. Therefore, a CT image reconstruction technique that converts low quality CT images into high-quality images is very important.

To this end, filtering-based reconstruction techniques and model-based reconstruction techniques are used, but both techniques have disadvantages. The filter-based reconstruction technique has the advantage of a fast reconstruction speed. However, the filter-based reconstruction technique is vulnerable to noise and artifacts, and thus it is difficult to obtain a high-quality image using the filter-based reconstruction technique. In addition, it is possible to obtain high-quality images using the model-based reconstruction technology, which is robust against noise and artifacts, but the model-based reconstruction technology has disadvantages of a high computational amount and a slow reconstruction speed.

In order to address the shortcomings associated with these filtering-based and model-based reconstruction techniques, deep learning reconstruction techniques have been proposed. Related art 1 discloses a technology for suppressing both noise and artifacts in LDCT images. Related art 1 uses a specific scale and orientation attribute to distinguish between noise and artifacts in the image structure, and introduces parallel implementation to increase the overall processing speed by more than 100 times.

As such, the recent deep learning-based CT denoising technique has shown good results. However, in the deep learning-based CT denoising technique, when the model is trained, the entire structure of the image and information on the detailed parts in the image are not considered, such that features extracted from the model are duplicated or inefficient. This eventually leads to the quality of the image being degraded.

That is, conventional deep learning-based CT denoising techniques have difficulty in reflecting the characteristics of signals in different frequency bands. However, high-frequency components play an important role in denoising. Therefore, even deep learning with a large number of parameters has difficulty in efficiently removing many artifacts.

The above-described background technology is technical information that the inventors hold for the derivation of the present disclosure or that the inventors acquired in the process of deriving the present disclosure. Thus, the above-described background technology may not necessarily be regarded as known technology disclosed to the general public prior to the filing of the present application.

RELATED ART DOCUMENTS

Related Art 1: Yang Chen, Zhou Yang, Yining Hu, Guanyu Yang, Yongcheng Zhu, Yinsheng Li, Wufan Chen, Christine Toumoulin, et al. Thoracic low-dose CT image processing using an artifact suppressed large-scale nonlocal means. Physics in medicine & biology, 57(9):2667, 2012.

SUMMARY OF THE INVENTION

The present disclosure is directed to providing a method and apparatus for denoising an original image while minimizing damage to the original image.

The present disclosure is further directed to providing a method and apparatus capable of obtaining high-quality CT images while minimizing radiation damage to patients during CT scans.

The present disclosure is still further directed to addressing the limitation due to the non-uniform distribution of artifacts in LDCT images.

The present disclosure is still further directed to addressing the shortcomings wherein only learning of the overall shape of an image is reinforced, and detailed structures of the image are not maintained.

The present disclosure is still further directed to reducing the occurrence of inefficient spatial redundancy on a network for image processing.

The present disclosure is not limited to what has been described above, and other aspects not mentioned herein will be apparent from the following description to one of ordinary skill in the art to which the present disclosure pertains. Further, it is understood that the objects and advantages of the present disclosure may be embodied by the means and a combination thereof in claims.

An image processing method according to one embodiment of the present disclosure may include: receiving a scanned image; and processing the received image through an octave convolution-based neural network to output a high-quality image and an edge image for the received image.

An octave convolution-based neural network according to one embodiment of the present disclosure may include: a plurality of octave encoder blocks; and a plurality of octave decoder blocks, wherein each octave encoder block may include an octave convolutional layer, and may be configured to output a high-frequency feature map and a low-frequency feature map for the image.

In addition, an octave convolution-based neural network according to one embodiment of the present disclosure may be configured such that a low-frequency feature map for the image outputted from a first octave encoder block, which is a first block among a plurality of octave encoder blocks, is transferred to a second octave encoder block, which is a second block among the plurality of octave encoder blocks.

In addition, the high-frequency feature map for the image outputted from the first octave encoder block may be transferred to a first octave decoder block, which is the last block among the plurality of octave decoder blocks.

In addition, the octave convolution-based neural network according to another embodiment of the present disclosure may further include: a link block configured to connect the plurality of encoder blocks and the plurality of decoder blocks; and an edge decoder block configured to be connected to the link block and output an edge image for the image, wherein the link block may be configured to provide, to the edge decoder block and the decoder block, a low-frequency feature map for the image received from the plurality of encoder blocks.

Here, each octave encoder block may be configured to output a lower frequency feature map that is more contracted than the received feature map, and each octave decoder block may be configured to output a feature map that is more expanded than the received feature map.

In addition, an octave convolution-based neural network according to one embodiment of the present disclosure may further include: a reconstruction layer configured to be connected to the output interface of the plurality of decoder blocks, wherein the reconstruction layer may be configured to generate a high-quality image for the original image based on the original image and a feature map for the image outputted from the first octave decoder block.

In addition, an octave convolution-based neural network according to another embodiment of the present disclosure may further include: a frequency decomposition layer configured to receive the image and separate the image into high-frequency component data and low-frequency component data, wherein the first octave encoder block may be configured to be connected after the frequency decomposition layer, and the first octave decoder block may be configured to be connected before the reconstruction layer.

An image processing device according to one embodiment of the present disclosure may include: a memory; and a processor configured to be connected to the memory and execute computer readable instructions stored in the memory.

In addition, other methods and systems for implementing the present disclosure, and a computer-readable recording medium having a computer program stored thereon to execute such methods, may be provided.

Other aspects and features in addition as those described above will become clear from the accompanying drawings, claims, and the detailed description of the present disclosure.

An image processing method and apparatus according to embodiments of the present disclosure may address the limitation due to the non-uniform distribution of artifacts in an LDCT image so as to provide a high-quality CT image from the LDCT image.

In addition, an image processing method and apparatus according to the embodiments of the present disclosure may address the shortcomings wherein only learning of the overall shape of an image is reinforced and detailed structures of an image are not maintained, thereby providing an image processing neural network model that provides high-quality images.

Accordingly, the image processing method and apparatus according to an embodiment of the present disclosure may provide a high-quality CT image while minimizing radiation damage to patients during CT scans.

The image processing method and apparatus according to an embodiment of the present disclosure enables high-quality CT images to be generated from LDCT images, thereby minimizing radiation damage to patients, improving diagnostic accuracy through the CT images, and reducing diagnostic time.

The effects of the present disclosure are not limited to those mentioned above, and other effects not mentioned may be clearly understood by those skilled in the art from the following description.

BRIEF DESCRIPTION OF THE DRAWINGS

FIG. 1 is a diagram schematically illustrating an octave convolution-based neural network configured to denoise a CT image according to one embodiment of the present disclosure.

FIG. 2 is a diagram schematically illustrating an octave convolutional layer according to one embodiment of the present disclosure.

FIG. 3 is a diagram illustrating in detail an encoder block of an octave convolution-based neural network according to one embodiment of the present disclosure.

FIG. 4 is a diagram illustrating in detail a decoder block of an octave convolution-based neural network according to one embodiment of the present disclosure.

FIG. 5 is a diagram illustrating in detail a link block of an octave convolution-based neural network according to one embodiment of the present disclosure.

FIG. 6 is a diagram schematically illustrating an image processing device according to one embodiment of the present disclosure.

FIG. 7 is a flowchart illustrating an image processing method according to one embodiment of the present disclosure.

FIG. 8 illustrates an LDCT image, a normal-dose CT (NDCT) image, and a difference map between the LDCT image and the NDCT image.

FIG. 9 illustrates high-quality CT images and edge images outputted from an octave convolution-based neural network according to one embodiment of the present disclosure.

FIGS. 10(a), 10(b), 10(c), 10(d) and 10(e) are diagrams illustrating a comparison of results obtained by processing a CT image in various ways.

FIG. 11 is a diagram schematically illustrating an entire process of processing an input image to provide an output image using an octave convolution-based neural network according to another embodiment of the present disclosure.

DETAILED DESCRIPTION

The advantages and features of the present disclosure and methods to achieve them will be apparent from the embodiments described below in detail in conjunction with the accompanying drawings.

However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

The present embodiment relates to a learning network configured to denoise an LDCT image to output an NDCT image. LDCT scans, which are used to reduce radiation damage to patients, output low-quality data. Accordingly, it is necessary to obtain a high-quality CT image by denoising the LDCT image.

Although high-frequency components play a very important role in the CT image denoising, since conventional CT denoising techniques had difficulty in reflecting the characteristics of signals in other frequency bands, the CT image denoising was performed in a state in which high and low frequencies are combined. Therefore, even in the case of deep learning with a large number of parameters, many artifacts could not be efficiently removed.

Accordingly, the present embodiment proposes a CT image denoising learning network that may decompose high-frequency and low-frequency signal features and may focus on each of the high-frequency and low-frequency bands during training.

Briefly, the learning network configured to denoise the CT images according to the present embodiment uses octave convolution, which receives a feature map with low-frequency and a feature map with high-frequency and extracts information directly from both feature maps by using inter-convolution and intra-convolution.

The octave convolution separates an image to be inputted into the original image and a half-size image. Using the octave convolution, learning of each of the low and high-frequency bands is possible. Using inter-convolution and intra-convolution, it is also possible to learn the relationship between low-frequency and high-frequency components.

Furthermore, in the present embodiment, a loss function such as L1 and edge loss may be used to obtain context information.

That is, in the present embodiment, the feature maps are divided into low-frequency component and high-frequency component, and parameters focused on information on the high-frequency component may be learned. In addition, the CT image denoising network according to the present embodiment includes an octave convolution and a residual path, which may receive feature maps for two frequency components and directly extract information from the feature maps without the need to decode the two frequency components. In addition, in the present embodiment, loss functions, such as L1 and edge loss may be used to optimize the network in order to maintain edge detail and style while reducing noise.

Accordingly, in the present embodiment, by removing spatial redundancy, the noise may be efficiently removed while maintaining edge sharpness.

In summary, in the present embodiment: (1) multi-scale representation learning is applied to the CT denoising problem; (2) since there is a lot of spatial redundancy in the CT images, in order to address the CT image denoising problem, the octave convolution, which is often used for image classification, may be extended and applied to the CT image denoising; and (3) by introducing loss functions (L1 and edge loss) to maintain edge sharpness while removing noise, the high-frequency and low-frequency regions may be optimized.

Meanwhile, the network of the present embodiment has been described in relation to the CT image denoising, but is not limited thereto, and may be applied to improve the quality of various images, particularly, medical images.

The denoising network model of the present embodiment showed better performance quantitatively and qualitatively than the conventional CT image denoising techniques, which will be described as a test result to be described below.

FIG. 1 is a diagram schematically illustrating an octave convolution-based neural network configured to denoise a CT image according to one embodiment of the present disclosure.

Referring to FIG. 1 more specifically, a learning network of the present embodiment is the octave convolution-based neural network. When an LDCT image is inputted, the octave convolution-based neural network gradually contracts the size of feature maps from the LDCT image by using a plurality of encoder blocks, expands the size of the feature maps again by using a plurality of decoder blocks, and then outputs a high-quality CT image by using a reconstruction layer.

The octave convolution-based neural network of the present embodiment follows a U-Net structure including an encoder block and a decoder block (a structure in which a feature map is contracted and then expanded again). The U-Net may include a k-level encoder and decoder blocks. In the decoding process, an output of an encoder block of each level is concatenated by a skip connection so as to perform decoding.

When the U-Net structure is used, high-level information may be extracted from a wide receptive field whenever the feature map is contracted, thereby improving prediction performance. In particular, in the case of the CT image reconstruction, since there are many cases where it is necessary to distinguish between noise and edge in a wide area, such a U-Net structure may be advantageous.

Since a general encoder-decoder structure does not use an octave net, it has the spatial redundancy problems mentioned above. That is, due to the characteristic of general convolution that a group of filter channels is adapted to an image of one band (scale), filters related to the low-frequency component responsible for the structure of the entire image are often trained repeatedly.

Therefore, it is difficult to process high-frequency signals having a high correlation with actual noise and edge. Accordingly, the present disclosure proposes the octave convolution-based neural network in which an octave net is combined with a U-Net structure of an encoder-decoder.

In addition, the octave convolution-based neural network according to an embodiment of the present disclosure may include a plurality of encoder blocks (e.g., encoder blocks 1, 2, 3), a plurality of decoder blocks (e.g., a plurality of decoder blocks 1, 2, 3), a link block connecting the encoder block and the decoder block, a plurality of edge decoder blocks additionally configured to be connected to the link block (e.g., edge decoder blocks 1, 2, 3), and a reconstruction layer.

A feature map contracted and extracted through a plurality of encoder blocks may be expanded and processed through decoder blocks to be outputted as a denoised high-quality CT image. The feature map contracted and extracted through the plurality of encoder blocks may be processed through edge decoder blocks to be outputted as an edge image for the inputted CT image.

In an embodiment, the encoder block 1 may include a layer configured to decompose a frequency to extract a feature map of a high-frequency band and a feature map of a low-frequency band from the inputted LDCT image. In another embodiment, a frequency decomposition layer may be included between the input interface to which the LDCT image is inputted and the encoder block 1. The frequency decomposition layer may receive the LDCT image, separate it into high-frequency component data and low-frequency component data, and then transfer them to the encoder block 1.

Each encoder block may include an octave convolutional layer, and output a high-frequency feature map and a low-frequency feature map for the LDCT image. An encoder block including the octave convolutional layer may be referred to as an octave encoder block. The octave convolutional layer may separate the features of the inputted image into a high-frequency feature and a low-frequency feature.

Regarding the separation ratio of the high-frequency component to the low-frequency component, the sizes of the high-frequency component and the low-frequency component to be separated may be determined by setting a hyper-parameter α. The sizes of the outputted high-frequency and low-frequency feature maps are $(1-\alpha)C \times H \times W$ and $\alpha C \times H/2 \times W/2$, respectively. Here, C is the number of channels from which the feature map is extracted and is a natural number. α is a rational number ranging from 0 to 1 and may be set as a rational number that makes αC a natural number.

The first block of the octave encoder blocks, that is, the octave encoder block 1, may transfer the low-frequency feature map extracted in the low-frequency band for the LDCT image to the next encoder block, that is, the octave encoder block 2. The octave encoder block 1 may transfer the high-frequency feature map extracted in the high-frequency band for the LDCT image to the corresponding last decoder block, that is, the octave decoder block 1.

The second block of the octave encoder blocks, that is, the octave encoder block 2, may transfer the low-frequency feature map extracted in the low-frequency band for the LDCT image to the next encoder block, that is, the octave encoder block 3. The octave encoder block 2 may transfer the high-frequency feature map extracted in the high-frequency band for the LDCT image to the corresponding second-to-last decoder block, that is, the octave decoder block 2.

The third block of the octave encoder blocks, that is, the octave encoder block 3, may transfer the low-frequency feature map extracted in the low-frequency band for the LDCT image to the link block. The octave encoder block 3 may transfer the high-frequency feature map extracted in the high-frequency band for the LDCT image to the corresponding third-to-last decoder block, that is, the octave decoder block 3.

The link block may be configured to connect a plurality of octave encoder blocks and a plurality of octave decoder blocks. The output interface of the link block may be configured to be connected to the octave decoder block 3 and the edge decoder block 3.

The octave decoder block 3 receives a low-frequency feature map from a link block and a high-frequency feature map from the octave encoder block 3. In the octave decoder block 3, the low-frequency feature map received from the link block and the high-frequency feature map received from the octave encoder block 3 are concatenated, such that less boundary information in the image may be lost and denoising may be effectively performed as compared to the case of using only the low-frequency feature map.

The learning network of the present embodiment may be trained end-to-end using the LDCT image as an input and an NDCT image as ground truth. That is, in the training process, the learning network may be trained to extract features by itself and optimize parameters.

Hereinafter, each configuration of the learning network according to the present embodiment will be described in more detail.

Frequency Decomposition Layer

In the present embodiment, the frequency decomposition layer may receive the LDCT image and divide the LDCT image of 1 channel into the low-frequency band and the high-frequency band of C channels. In order to decompose the LDCT image into each frequency band, the general convolution may be applied in the present embodiment.

In the present embodiment, the output of the frequency decomposition layer may be represented by X with the size of C×H×W, where H is the height and W is the width. In the present embodiment, the number of channels may be subdivided to define the low-frequency and high-frequency bands.

In addition, in the present embodiment, the number of channels for denoising is determined by a ranging from 0 to 1. α is a hyper-parameter which controls how many low-frequency channels will be used among base channels C. That is, the low-frequency band channel $C_l$ may be defined as αC, while the high-frequency band channel $C_h$ may be defined as $(1-\alpha)C$.

That is, the high-frequency band $X^h$ that captures the detailed part of the image may be defined as $X^{(1-\alpha)C \times H \times W}$, and the low-frequency band $X^l$ that captures the overall structure of the image may be defined as $X^{\alpha C \times H \times W}$. The low-frequency band $X^l$ may be downsampled to half the size of the high-frequency band $X^h$ along the height and width dimensions. That is, the height and width of the feature map in the low-frequency band is ½ of the height H and width W of the feature map in the high-frequency band. Similarly, it can be said that the dimensions of the feature map in the low-frequency band (elements that determine the size of the feature map, such as length, height, or width) have half the dimensions of the feature map in the high-frequency band.

Octave Convolution

FIG. 2 is a diagram schematically illustrating an octave convolutional layer according to one embodiment of the present disclosure.

In the octave convolutional layer, $C_l$ low-frequency feature maps each having a size of 0.5H×0.5 W and $C_h$ high-frequency feature maps each having a size of H×W may be inputted. The inputted low-frequency feature map and high-frequency feature map may be processed using a convolutional kernel. The convolutional kernel includes low-to-low convolution, low-to-high convolution, high-to-high convolution, and high-to-low convolution.

The low-frequency feature map that has been subjected to low-to-high convolution and upsampling is combined with the high-frequency feature map that has been subjected to high-to-high convolution to output a new high-frequency feature map. The low-frequency feature map subjected to low-to-low convolution is combined with the high-frequency feature map subjected to downsampling and high-to-low convolution to output a new low-frequency feature map.

The octave convolution illustrated in FIG. 2 is based on Yunpeng Chen et al., "Drop an Octave: Reducing Spatial Redundancy in Convolutional Neural Networks with Octave Convolution" published in 2019.

However, the present embodiments may utilize such octave convolution to process medical images such as CT images, and combine the encoder-decoder structure and the edge decoder structure in a novel manner, thereby providing high-quality (denoised) CT images and more clear information necessary for medical judgment on blood vessels, organs and the like.

In order to reconstruct the CT image, all of the high-frequency and low-frequency features, and low-level and high-level features should be considered together. However, in the general convolutional layer, calculations are performed in units of a group of filter channels, which makes it difficult to process high-frequency signals. Accordingly, in the present embodiment, the octave convolution rather than the general convolution is used, such that features of high-frequency components that cannot be processed in the general convolution may be effectively processed.

Octave Encoder Block

FIG. 3 is a diagram illustrating in more detail an encoder block of an octave convolution-based neural network according to one embodiment of the present disclosure.

In the encoder block, a pooling process may be performed on feature maps that have been subjected to the octave convolution and an activation function (e.g., ReLU) twice. The pooling process may be replaced with a low-frequency component outputted from the octave convolution. The outputted low-frequency component may have a size of αC×H/2×W/2 (αC feature maps each having a size of H/2×W/2) when an image with a size of H×W is inputted into the octave encoder block. The outputted high-frequency component may have a size of (1−α)C×H×W ((1−α)C feature maps each having a size of H×W).

The low-frequency component may be contracted to a half-sized image having a size of αC×H/2×W/2 as in general pooling, and used like pooling. Instead of max pooling or average pooling processes, by using, in the next layer, the low-frequency signal result of octave convolution, a receptive field may be widened.

Among the outputs from the octave encoder block, the low-frequency feature map may be transferred to a next encoder block, and the high-frequency feature map may be transferred to a decoder block corresponding to that octave encoder block.

Octave Decoder Block

FIG. 4 is a diagram illustrating in detail a decoder block of an octave convolution-based neural network according to one embodiment of the present disclosure.

The octave decoder block may receive a low-frequency feature map outputted from the previous decoder block and a high-frequency feature map outputted from an encoder block corresponding to that octave decoder block.

In the decoder block, the high-frequency feature map of octave convolution may be used to focus on high-frequency components. While the conventional U-Net concatenates the entire feature maps that include both high-frequency and low-frequency components, the structure of the present disclosure may concatenate the reconstructed low-frequency feature map and the high-frequency feature map separated in the encoder block.

Accordingly, each separated frequency component may be fully used for decoding and spatial redundancy may be reduced, thereby enabling accurate image reconstruction.

Referring to FIG. 4, the octave decoder block may include a concatenate layer, one or more octave convolution and activation function layers, and an upsampling layer, wherein the concatenate layer is configured to concatenate the low-frequency feature map received from a previous block and the high-frequency feature map received from a corresponding encoder block of that octave decoder block.

FIG. 5 is a diagram illustrating in detail a link block of an octave convolution-based neural network according to one embodiment of the present disclosure.

The link block may receive a low-frequency feature map from the last encoder block, upsample it, and transfer it to the first octave decoder block.

The link block may include one or more octave convolution and activation layers, and an upsampling layer as shown in FIG. 5. In addition, an edge decoder block may be configured to be connected to the link block in addition to the octave decoder block. The edge decoder block may extract the edge shape of the CT image based on a feature map received from the link block.

In the reconstruction layer, a residual image may be generated based on feature maps outputted from the octave decoder block, a noise image may be predicted, and the residual image and the noise image may be added to an inputted LDCT image to generate a high-quality CT image. The high-quality CT image may have similar or better quality compared to an NDCT image.

In order to denoise the original LDCT image, a residual connection between the LDCT image and the reconstruction layer may be established in the octave convolution-based neural network according to an embodiment of the present disclosure. Through this configuration, the octave convolution-based neural network according to an embodiment of the present disclosure may output the high-quality CT image.

Edge Decoder Block

As shown in FIG. 1, the edge decoder block may be configured in plural, but is not limited thereto, and may alternatively be configured as one edge decoder block. The edge decoder block is a model trained to extract the edge shape of the received image. The edge decoder block may output an image clearly representing the edge shape of the original CT image based on the feature map received through the encoder block and the link block.

In order to reconstruct the CT image, it is necessary to sharpen an edge or boundary signal while removing noise signals from high-frequency components. To this end, training is performed after adding, to the network, a layer configured for denoising and a layer configured for estimating an edge, which makes it possible for the network to efficiently process a high-frequency component signal required to consider both of the edge and the boundary.

An edge map is required for network training, and various edge detection techniques may be used to generate the edge map. In one embodiment of the present disclosure, the edge was extracted using a window range of −160 to 240 for the CT image, and using a Canny edge detection algorithm after performing histogram equalization. In conventional image processing models, fine blood vessels inside an organ targeted for CT scans are likely to be recognized as noise and removed. However, in the embodiment of the present disclosure, edge extraction is additionally performed, such that the shape of the fine blood vessels inside the organ and the boundaries of the organs may be clarified.

FIG. 6 is a diagram schematically illustrating an image processing device according to one embodiment of the present disclosure.

A CT image processing device 100 may include a memory 110, a transceiver 120, a processor 130, an input interface 140, and an output interface 150.

The memory 110 may store various pieces of information required for the operation of the CT image processing device 100, and store control software capable of operating the CT image processing device 100. The memory may include a volatile or nonvolatile recording medium.

The memory 110 may be configured to be connected to one or more processors 130, and may store codes that, when executed by the processor 130, cause the processor 130 to control the CT image processing device 100.

Here, the memory 110 may include a magnetic storage media or a flash storage media, but the present disclosure is not limited thereto. The memory 110 may include a built-in memory and/or an external memory, and may include a storage, for example, a volatile memory such as a DRAM, an SRAM, or an SDRAM, a non-volatile memory such as a one time programmable ROM (OTPROM), a PROM, an EPROM, an EEPROM, a mask ROM, a flash ROM, a NAND flash memory, or a NOR flash memory, a flash drive such as an SSD, a compact flash (CF) card, an SD card, a Micro-SD card, a Mini-SD card, an Xd card, or a memory stick, or a storage device such as an HDD.

In particular, in the present embodiment, the memory 110 may store a neural network model according to the present disclosure and a module configured to implement various embodiments of the present disclosure using the neural network model. In addition, the memory 110 may store information related to an algorithm configured to perform learning according to the present disclosure. In addition, the memory 110 may store various pieces of information necessary for achieving the object of the present disclosure. The information stored in the memory 110 may be updated with information received from a server or an external device or by a user input The transceiver 120 may interwork with a network to provide a communication interface required for providing, in the form of packet data, transmission/reception signals between the CT image processing device 100 and the external device (including a server). In addition, the transceiver 120 may be a device including hardware and software required to transmit and receive a signal such as a control signal or a data signal, through wired/wireless connection with other network devices.

The transceiver 120 may support a variety of object-to-object intelligent communications, for example, Internet of things (IoT), Internet of everything (IoE), and Internet of small things (IoST), and may support, for example, machine to machine (M2M) communication, vehicle to everything (V2X) communication, and device to device (D2D) communication.

The processor 130 may receive various pieces of data or information from the external device configured to be connected through the transceiver 120, and may transmit various pieces of data or information to the external device. In addition, the transceiver 120 may include at least one of a WiFi module, a Bluetooth module, a wireless communication module, and an NFC module.

The input interface 140 is an input interface through which various pieces of image data provided to the CT image processing device 100 are collected. Image data may be inputted by a user or obtained from a server, and may include, for example, a 3D CT scan image, and a 2D image generated by slicing a 3D image. In addition, the input interface 140 may receive a user command for controlling the operation of the CT image processing device 100, and may include, for example, a microphone and a touch display.

The output interface 150 is an output interface from which a result of learning performed in the CT image processing device 100 is outputted. For example, a denoised NDCT image may be outputted. In addition, the output interface 150 may include, for example, a speaker and a display.

The processor 130 may control the overall operation of the CT image processing device 100. Specifically, the processor 130 is configured to be connected to other components of the CT image processing device 100, including the memory 110 described above, and may control the overall operation of the CT image processing device 100 by executing at least one command stored in the memory 110.

The processor 130 may be implemented in various ways. For example, the processor 130 may include at least one of an application specific integrated circuit (ASIC), an embedded processor, a microprocessor, a hardware control logic, a hardware finite state machine (FSM), and a digital signal processor (DSP).

The processor 130 is a sort of central processor, and may control the overall operation of the CT image processing device 100 by driving control software installed in the memory 110. The processor 130 may include all types of devices capable of processing data. Here, the "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

In the present embodiment, the processor 130 may perform machine learning such as deep learning on the obtained CT image so as to enable the CT image processing device 100 to output an optimal result of the denoised image reconstruction. The memory 110 may store, for example, data used in the machine learning, and result data.

Meanwhile, the learning network of the present embodiment may learn a 64×64 size patch. When testing the learning network, it is possible to test the images larger than 64×64 size patch. In addition, in the present embodiment, field of view (FOV) sampling and data augmentation may be used for training the network efficiently and robustly. Here, the FOV sampling is a technique of extracting a training patch based on the FOV of the CT image so that the training patch may include various organs and boundaries.

For data augmentation, random rotation [90, 180, 270], random rescale [0.5, 2], random flip [Horizontal, Vertical] may be used. In addition, PyTorch, which is an open source machine learning library, may be used as a framework, and Adam optimization may be used. In addition, training may be performed up to 100 epochs. Here, one epoch means that the artificial neural network has completed a forward pass/backward pass process once for the entire data set, that is, it may mean a state in which training has been completed once for the entire data set. A backpropagation algorithm used in the neural network includes a forward pass and a backward pass. During the forward pass, a process of calculating the weight of each layer from input to output by using parameters is performed. During the backward pass, a process of recalculating and correcting the existing weights is performed while proceeding in the opposite direction to the forward pass. When the corresponding process (forward pass+backward pass) is completed for this entire data set, it can be said that one epoch has been performed.

In addition, in the learning network of the present embodiment, the learning rate may be gradually decreased from 0.0001 to 0.00001, and the number of base channels C may be set to 64 excluding the frequency decomposition layer and the denoising block.

Meanwhile, specific embodiments of the learning network described above are not intended to be limited, and may be modified according to embodiments.

FIG. 7 is a flowchart illustrating an image processing method according to one embodiment of the present disclosure.

The CT image processing device 100 may receive an LDCT image (S710).

The LDCT image may be an image which is scanned by an external device and then received through wired or wireless communication. Alternatively, when the CT image processing device 100 is integrally provided in an LDCT scanner, the LDCT image may be an image which is obtained by the LDCT scanner and received through an internal communication network.

The received CT image may be processed using the octave convolution-based neural network described above (S720). The received CT image may be subjected to high-quality processing such as denoising while passing through the octave encoder block, link block, and octave decoder block of the neural network described above. In addition, the received CT image may be processed while passing through the octave encoder block, the link block, and the edge decoder block, and then outputted as an edge image representing an edge shape.

Through this, the CT image processing device 100 according to an embodiment of the present disclosure may output a medical image including as much as or more information for medical judgment than an NDCT image, while minimizing damage to patient by the LDCT scan.

The above-described octave convolution-based neural network may output a high-quality CT image and an edge image from the LDCT image through the processing described above (S730).

FIG. 8 illustrates an LDCT image, an NDCT image, and a difference map between the LDCT image and the NDCT image.

As illustrated in FIG. 8, the LDCT image has more noise and lower image quality than the NDCT image, so there may be a risk of causing inaccurate diagnosis.

However, since LDCT scans emit a lower amount of radiation to the patient's body compared to NDCT scans, the LDCT scans may be useful in reducing the risk of radiation exposure.

According to an embodiment of the present disclosure, as shown in FIG. 8, since a high-quality medical image such as the NDCT image may be generated from the LDCT image, there is an advantageous effect of reducing the risk of radiation exposure to patients and increasing the accuracy of diagnosis using the high-quality medical image.

FIG. 9 illustrates high-quality CT images and edge images outputted from an octave convolution-based neural network according to one embodiment of the present disclosure.

The above-described octave convolution-based neural network may receive an LDCT image and output a high-quality image and an edge image which are denoised as shown in FIG. 9.

Here, the high-quality image may mean an image from which noise has been removed or an image with improved resolution compared to the original image, and the edge image may mean an image in which the boundaries of objects (in the case of a CT image, organs and blood vessels) included in the original image are represented by lines.

The high-quality image and the edge image as shown in FIG. 9 may convey more accurate information on the patient's condition, and thus, the medical staff may perform more accurate diagnosis and treatment.

FIG. 10 is a diagram illustrating a comparison of results obtained by processing a CT image in various ways.

FIG. 10 is a visualized diagram of patient data in a dataset for verifying CT image denoising according to an embodiment of the present disclosure. With reference to FIG. 10, the denoising performance of the learning network according to the present embodiment may be verified.

In the present embodiment, the dataset includes abdominal LDCT and NDCT image data taken from 10 patients, wherein image size is 512×512, voxel size is 0.5 mm×0.5 mm, and slice thickness is 3 mm. To verify the denoising performance of the learning network of the present embodiment, the learning network may be compared with a CNN and a REDCNN. The CNN is a basic network with 10 convolutional layers and residual connection. The REDCNN is a network having an encoder-decoder structure with several residual connections and 10 layers. For fair comparison, in the learning network of the present embodiment, the number of octave convolutional layers N of the denoising block may be set to 10, equal to the number of layers in the REDCNN. The denoising performance was measured by peak signal-to-noise ratio (PSNR), root-mean-square error (RMSE), and structural similarity (SSIM), and 2-fold cross-validation was performed on 10 patients.

TABLE 1

|  | LDCT | CNN | REDCNN | Ours |
|---|---|---|---|---|
| PSNR | 27.2769 ± 1.17 | 31.1437 ± 1.05 | 31.1911 ± 0.92 | 31.4500 ± 0.96 |
| SSIM | 0.8052 ± 0.0385 | 0.8645 ± 0.0255 | 0.8631 ± 0.0248 | 0.8653 ± 0.0247 |
| RMSE | 0.0446 ± 0.0062 | 0.0285 ± 0.0036 | 0.0281 ± 0.0031 | 0.0276 ± 0.0033 |

Table 1 shows the mean PSNR, RMSE, and SSIM results for cross-validation of 10 patients. In the conventional CNN using the convolutional layer, most of the parameters are used for low-frequency signals, so the artifacts were not effectively removed. In addition, the REDCNN having an encoder-decoder structure showed slightly increased denoising performance, but could not focus on important information due to the processes of contracting and expanding the feature maps of the network. On the other hand, it can be seen that the learning network of the present embodiment showed improved denoising performance compared to the CNN and the REDCNN because the learning network of the present embodiment was able to efficiently reduce spatial redundancy and focus on important information by using octave convolution. That is, in the present embodiment, by applying the octave convolution, the learning network of the present embodiment was able to efficiently reduce noise and minimize the loss of each frequency band, while balancing the low-frequency feature maps and the high-frequency feature maps.

In addition, for qualitative evaluation, it is very important to clearly visualize organs while removing noise. If the CT image is not denoised well or is over-smoothed, there may be difficulty in actual reading. In order to verify that the learning network of the present embodiment provides a high-quality denoised CT image, in the present embodiment, qualitative results of the learning network of the present embodiment may be compared with qualitative results of other CT denoising networks.

Referring to FIG. 10, (a) shows an LDCT input image, (b) shows a patch (red line) of an LDCT input image, (c) shows the result of the REDCNN, (d) shows the results of the learning network of the present embodiment, and (e) shows the NDCT patch. Referring to FIG. 10, it can be seen that the learning network result (d) of the present embodiment is sharper and clearer than (b) and (c).

In other words, referring to image (c) in FIG. 10, the REDCNN seems to remove much noise, but the image (c) looks blurry and over-smoothed. Therefore, the image (c) does not properly represent the details of the organ. On the other hand, the learning network of the present embodiment does not only remove much noise but also shows a balanced sharpness and texture by focusing on the high-frequency component. Through this, it can be confirmed that the quality of the denoised image generated from the learning network of the present embodiment is substantially similar to that of the NDCT image, such that the denoising performance of the learning network of the present embodiment is better than that of other conventional techniques.

In summary, it can be confirmed that in this embodiment, for denoising the LDCT image, by focusing on the low and high-frequency bands and applying the octave convolution to the denoising network, noise of LDCT is efficiently removed and the shapes and boundaries of organs are clarified. In addition, the CT image processing device 100 of the present embodiment may reduce the radiation damage to patients, help radiologists analyze CT images, and be also applied to various medical image enhancement problems.

FIG. 11 is a diagram schematically illustrating an entire process of processing an input image to provide an output image using an octave convolution-based neural network according to another embodiment of the present disclosure.

An octave convolution-based neural network according to another embodiment of the present disclosure may include an input block to which an LDCT image is inputted, an output block from which an NDCT image is outputted, and a hidden layer area largely including three parts.

Here, the hidden layer area may include a frequency decomposition layer, octave convolutional block, and a reconstruction layer.

In the learning network of the present embodiment, the frequency decomposition layer decomposes the input image into low and high-frequency bands by applying the convolutional layer. The octave convolutional block is a denoising block. Given the output of the frequency decomposition layer, the octave convolutional block may extract and remove noise between the low-frequency band and the high-frequency band. Finally, the reconstruction layer may apply the convolutional layer to the image processed by the denoising block, and then output the result.

In an octave convolution-based neural network according to another embodiment of the present disclosure, a plurality of patches may be extracted from the input image depending on a region of interest; the extracted plurality of patches may be decomposed into low and high frequencies using the frequency decomposition layer; and image features may be extracted using the octave convolution described above.

After processing in the plurality of octave convolutional blocks, a patch denoised by the reconstruction layer may be outputted.

Hereinafter, the frequency decomposition layer, the octave convolutional block (also referred to as a denoising block depending on the function), and the reconstruction layer will be described in more detail. The following description of layers may also be applied to corresponding layers of the octave convolutional neural network according to an embodiment of the present disclosure.

Frequency Decomposition Layer

The frequency decomposition layer may receive an LDCT image and decompose the LDCT image of 1 channel into a high-frequency band and a low-frequency band of C channels. For decomposition into each frequency band, the general convolution may be applied in the present embodiment.

The output of the frequency decomposition layer is X with the size of C×H×W, where H is the height and W is the width. In the present embodiment, the number of channels may be subdivided to define the low and high frequencies.

In addition, in the present embodiment, the number of channel for denoising is determined by a ranging from 0 to 1. α is a hyper-parameter which controls how many low-frequency channels will be used among the base channels C. That is, the low-frequency band channel $C_l$ may be defined as $\alpha C$, while the high-frequency band channel $C_h$ may be defined as $(1-\alpha)C$.

That is, the high-frequency band $X^h$ that captures the detailed part of the image may be defined as $X^{(1-\alpha)C \times H \times W}$, and the low-frequency band $X^l$ that captures the overall structure of the image may be defined as $X^{\alpha C \times H \times W}$. At this time, the low-frequency band $X^l$ is downsampled to half the size of the high-frequency band $X^h$ along the height and width dimensions.

Octave Convolutional Block

In the present embodiment, as shown in FIG. 11, for processing the low and high-frequency bands and their interaction, the octave convolution may be repeated N times. For a detailed configuration of the octave convolution, refer to FIG. 2.

In the n-th octave convolutional layer of the octave convolutional block, the low-frequency feature map $f_l^n$ and the high-frequency feature map $f_h^n$ are received as inputs and four convolutions may be performed. The four convolutions may include intra-convolution (low-to-low convolution, high-to-high convolution) and inter-convolution (lowto-high convolution, high-to-low convolution). That is, each octave convolutional layer may be configured with a multi-branch structure. Each convolution of the octave convolutional layer may predict the feature map while maintaining the number of channels. However, high-to-low convolution may use downsampled high-frequency input to get feature maps of the same size as the output of low-to-low convolution.

In addition, in the learning network of the present embodiment, in order to combine information of frequency bands in the last layer, the octave convolutional block sums the outputs of the intra convolution and the inter convolution element-wise.

Meanwhile, the output of the n-th octave convolutional block may be used at the (n+1) th octave convolution block or the reconstruction layer.

Ultimately, the learning network of the present embodiment may be trained and function to balance the sharpness and smoothness of the original image in the octave convolutional block or the denoising block.

Meanwhile, in the learning network of the present embodiment, the octave convolutional block or the denoising block may be configured with a U-Net structure having an encoder-decoder structure (a structure in which the feature map is contracted and then expanded again).

The learning network of the present embodiment may include a k-level encoders and decoders as shown in FIG. 1. In the decoding process, the output of the encoder of each level is concatenated by a skip connection so as to perform decoding.

When the U-Net structure is used as in the present embodiment, high-level information in a wide receptive field may be extracted whenever the feature map is contracted, thereby improving prediction performance. In particular, in the case of CT image reconstruction, since there are many cases where it is necessary to distinguish between noise and edge in a wide area, it may be advantageous to apply the U-Net structure as in the present embodiment.

In addition, in the present embodiment, since the octave convolution rather than the general encoder-decoder structure is used, it is possible to address the spatial redundancy problem. That is, due to the characteristics of the general convolution, a group of filter channels is adapted to an image of one band (scale), filters related to the low-frequency component responsible for the structure of the entire image are often trained repeatedly. Therefore, it is difficult to process high-frequency signals having a high correlation with actual noise and edge. Accordingly, in the present embodiment, a structure in which the octave convolution is applied to the encoder-decoder structure may be proposed.

The learning network of the present embodiment may include encoder blocks (octave encoder block 1, octave encoder block 2, and octave encoder block 3) and two types of decoder blocks (octave decoder block 1, octave decoder block 2, and octave decoder block 3; edge decoder block 1, edge decoder block 2, and edge decoder block 3 of edge flow).

The octave decoder is a decoder configured for the CT image denoising, and the edge decoder block is a decoder configured for edge prediction.

When the octave convolution is applied to the encoder, high-frequency component data and low-frequency component data are generated. In the present embodiment, the pooling process may widen the receptive field by using the low-frequency component data, and processing of the high-frequency component may be effectively performed by connecting only the high-frequency component data to the decoder through a skip connection.

That is, in order to reconstruct the CT image, all of the high-frequency and low-frequency feature maps, and low-level and high-level feature maps should be considered together. However, in the general convolution, calculations are made on a per group of filter channels basis, which makes processing of high-frequency signals difficult. Accordingly, in the present embodiment, as shown in FIG. 3, convolutions in the encoder block, decoder block, and bottom block are all replaced with the octave convolution, and thus, high-frequency component feature maps that cannot be processed by the general convolution may be processed effectively.

In addition, in the present embodiment, the pooling process in the encoder block may be replaced with the low-frequency component outputted from the octave convolution. Since the low-frequency component may be contracted to a half-sized image having a size of $$\alpha \times \frac{H}{2} \times \frac{W}{2}$$

as in the general pooling, the low-frequency component may be used like pooling.

That is, in the present embodiment, the receptive field may be widened by using, in the next layer, the low-frequency signal resulting from the octave convolution instead of max pooling or average pooling.

In the learning network of the present embodiment, in order to focus on the high-frequency component, the high-frequency feature map from the octave convolution may be used in the decoding process. While the conventional U-Net concatenates the entire feature map that includes both high-frequency and low-frequency components, in the present disclosure, the reconstructed low-frequency feature map and the high-frequency feature map separated by the encoding may be concatenated. Accordingly, each separated frequency component may be fully used for decoding and spatial redundancy may be reduced, thereby enabling accurate image reconstruction.

In addition, in the present embodiment, a of the last octave convolution of the denoising block may be set to 0, and convolution may be performed so that the number of subsequent channel is set to 1.

In addition, the network of the present embodiment may further include an edge detection decoder for the high-frequency band. In order to reconstruct the CT image, it is necessary to sharpen an edge or boundary signal that is likely to be removed in the process of removing noise signals from high-frequency components.

Accordingly, in the present embodiment, since training proceeds after adding, to the learning network, a decoder configured for denoising and a decoder configured for estimating the edge, it is possible to efficiently process a high-frequency component signal while considering both the noise and the edge.

An edge map is required to train the learning network of the present embodiment, and various edge detection techniques may be used to generate the edge map. For example, as shown in FIG. 4, in the present embodiment, the edge may be extracted using a window range of −160 to 240 for the CT image, and a Canny edge detection algorithm after performing histogram equalization. That is, the fine blood vessels inside the organ are highly likely to be removed during the denoising process, but in the present embodiment, by also considering the edge extraction, the fine blood vessels may be maintained without being removed.

The reconstruction layer may generate a residual image based on feature maps outputted from the denoising block. In order to denoise the original image, in the present embodiment, a residual connection may be established between an input block receiving the original image and an output interface of the denoising block.

Meanwhile, most denoising networks may frequently generate over-smoothed images due to the limitations of basic L2. In contrast, in the present embodiment, in order to prevent the edge from being over-smoothed, loss functions such as L1 loss and edge loss may be used. This may be expressed as in Equation 4.

$$L = L_1 + \beta L_E \quad \text{[Equation 4]}$$

where $\beta$ is the weight of the edge loss. In the present embodiment, $\beta$ may be set to 0.01.

The L1 loss may be defined as the following Equation 5 with a predicted value $\hat{y}$ and a label y, where k is the batch size.

$$L_1(\hat{y}, y) = \frac{1}{K} \sum_{k=1}^{K} \frac{1}{H_k W_k C_k} \|\hat{y}_k - y_k\|_1 \quad \text{[Equation 5]}$$

In the present embodiment, for edge loss $L_E$, L2 of the sobel filter may be calculated based on the edges of the original CT image and the denoised CT image, and the edge loss $L_E$ may be defined as in Equation 6 below.

$$L_E(\hat{y}, y) = \frac{1}{K} \sum_{k=1}^{K} \frac{1}{H_k W_k C_k} \|\text{sobel}(\hat{y}_k) - \text{sobel}(y_k)\|_2^2 \quad \text{[Equation 6]}$$

The learning network according to the present embodiment may be implemented by the CT image processing device 100 described above.

The above-described embodiments according to the present disclosure may be implemented in the form of a computer program that may be executed by various components on a computer, and the computer program may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (particularly in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

STATEMENT REGARDING GOVERNMENT SUPPORT

This invention was supported at least in part by Ministry of Science and ICT of South Korean government for research project, the title of which is "Technology Development for Deep Learning based CT image recovery and analysis" managed by IITP (Institute of Information & Communications Technology Planning & Evaluation).

DESCRIPTION OF SYMBOLS

100: CT image processing device
110: memory
120: transceiver
130: processor
140: input interface
150: output interface

What is claimed:

1. An image processing method, comprising:
   receiving a scanned image; and
   processing the received image through an octave convolution-based neural network to output a high-quality image and an edge image for the received image,
   wherein the octave convolution-based neural network comprises a plurality of octave encoder blocks and a plurality of octave decoder blocks,
   wherein each octave encoder block comprises an octave convolutional layer, and is configured to output a high-frequency feature map and a low-frequency feature map for an image inputted to each octave encoder block, and
   wherein a first octave encoder block, which is a first block among the plurality of octave encoder blocks, is configured to:
      transfer the low-frequency feature map outputted from the first octave encoder block to a second octave encoder block, which is a second block among the plurality of octave encoder blocks, without transferring the high-frequency feature map outputted from the first octave encoder block to the second octave encoder block, and transfer the high-frequency feature map outputted from the first octave encoder block to a first octave decoder block, which is the last block among the plurality of octave decoder blocks, without transferring the low-frequency feature map outputted from the first octave encoder block to the first octave decoder block.

2. The image processing method according to claim 1, wherein the octave convolution-based neural network further comprises:
a link block configured to connect the plurality of octave encoder blocks and the plurality of octave decoder blocks; and
an edge decoder block configured to be connected to the link block and output an edge image for the received image, and
wherein the link block is configured to provide, to the edge decoder block and the octave decoder block, a low-frequency feature map for the image received from the plurality of octave encoder blocks.

3. The image processing method according to claim 1, wherein each octave encoder block is configured to output a lower frequency feature map that is more contracted than the received feature map, and
wherein each octave decoder block is configured to output a feature map that is more expanded than the received feature map.

4. The image processing method according to claim 3, wherein the dimension of the low-frequency feature map outputted from each octave encoder block is half the dimension of the high-frequency feature map outputted from each octave encoder block.

5. The image processing method according to claim 2, wherein the octave convolution-based neural network further comprises a reconstruction layer configured to be connected to an output interface of the plurality of octave decoder blocks, and
wherein the reconstruction layer is configured to generate a high-quality image for the received image based on the received image and a feature map for the image outputted from the first octave decoder block.

6. The image processing method according to claim 5, wherein the octave convolution-based neural network further comprises a frequency decomposition layer configured to receive an image and separate the image into high-frequency component data and low-frequency component data, and
wherein the first octave encoder block is configured to be connected after the frequency decomposition layer, and the first octave decoder block is configured to be connected before the reconstruction layer.

7. The image processing method according to claim 1, wherein the received image is a low-dose computed tomography (LDCT) image scanned with a low-dose,
wherein the high-quality image is a computed tomography (CT) image obtained by denoising the LDCT image, and
wherein the edge image is an image showing boundaries of organs and blood vessels of a human body scanned by CT.

8. The image processing method according to claim 6, wherein the frequency decomposition layer separates the image into a low-frequency band and a high-frequency band through C channels, and among the C channels, $\alpha C$ channels are allocated to the low-frequency band, and $(1-\alpha)C$ channels are allocated to the high-frequency band, and wherein, C is a natural number, and a $(0<\alpha<1)$ is a rational number that makes aC a natural number.

9. A non-transitory computer-readable medium having a computer program stored thereon,
wherein the computer program, when executed on a computer, causes the computer to implement:
receiving a scanned image; and
processing the received image through an octave convolution-based neural network to output a high-quality image and an edge image for the received image,
wherein the octave convolution-based neural network comprises a plurality of octave encoder blocks and a plurality of octave decoder blocks,
wherein each octave encoder block comprises an octave convolutional layer, and is configured to output a high-frequency feature map and a low-frequency feature map for an image inputted to each octave encoder block, and
wherein a first octave encoder block, which is a first block among the plurality of octave encoder blocks, is configured to:
transfer the low-frequency feature map outputted from the first octave encoder block to a second octave encoder block, which is a second block among the plurality of octave encoder blocks, without transferring the high-frequency feature map outputted from the first octave encoder block to the second octave encoder block, and
transfer the high-frequency feature map outputted from the first octave encoder block to a first octave decoder block, which is the last block among the plurality of octave decoder blocks, without transferring the low-frequency feature map outputted from the first octave encoder block to the first octave decoder block.

10. An image processing device, comprising:
a memory; and
at least one processor configured to be connected to the memory and execute computer readable instructions stored in the memory,
wherein the at least one processor is configured to:
receive a scanned image; and
process the received image through an octave convolution-based neural network to
output a high-quality image and an edge image for the received image,
wherein the octave convolution-based neural network comprises a plurality of octave encoder blocks and a plurality of octave decoder blocks,
wherein each octave encoder block comprises an octave convolutional layer, and is configured to output a high-frequency feature map and a low-frequency feature map for an image inputted to each octave encoder block, and
wherein a first octave encoder block, which is a first block among the plurality of octave encoder blocks, is configured to:
transfer the low-frequency feature map outputted from the first octave encoder block to a second octave encoder block, which is a second block among the plurality of octave encoder blocks, without transferring the high-frequency feature map outputted from the first octave encoder block to the second octave encoder block, and
transfer the high-frequency feature map outputted from the first octave encoder block to a first octave decoder block, which is the last block among the plurality of octave decoder blocks, without transferring the low-frequency feature map outputted from the first octave encoder block to the first octave decoder block.

11. The image processing device according to claim 10, wherein the octave convolution-based neural network further comprises:
a link block connecting a plurality of octave encoder blocks and a plurality of octave decoder blocks; and
an edge decoder block configured to be connected to the link block and configured to output an edge image for the received image, and
wherein the link block is configured to provide, to the edge decoder block and the octave decoder block, a low-frequency feature map for the image received from the plurality of octave encoder blocks.

12. The image processing device according to claim 10, wherein each octave encoder block is configured to output a lower frequency feature map that is more contracted than the received feature map, and
wherein each octave decoder block is configured to output a feature map that is more expanded than the received feature map.

13. The image processing device according to claim 12, wherein the dimension of the low-frequency feature map outputted from each octave encoder block is half the dimension of the high-frequency feature map outputted from each octave encoder block.

14. The image processing device according to claim 11, wherein the octave convolution-based neural network further comprises a reconstruction layer configured to be connected to an output interface of the plurality of octave decoder blocks, and
wherein the reconstruction layer is configured to generate a high-quality image for the received image based on the received image and a feature map for the image outputted from the first octave decoder block.

15. The image processing device according to claim 14, wherein the octave convolution-based neural network further comprises a frequency decomposition layer configured to receive an image and separate the image into high-frequency component data and low-frequency component data, and
wherein the first octave encoder block is configured to be connected after the frequency decomposition layer, and the first octave decoder block is configured to be connected before the reconstruction layer.

16. The image processing device according to claim 10, wherein the received image is a low-dose computed tomography (LDCT) image scanned with a low-dose,
wherein the high-quality image is a computed tomography (CT) image obtained by denoising the LDCT image, and
wherein the edge image is an image showing boundaries of organs and blood vessels of a human body scanned by CT.

17. The image processing device according to claim 15, wherein the frequency decomposition layer separates the image into a low-frequency band and a high-frequency band through C channels, and among the C channels, αC channels are allocated to the low-frequency band, and (1−α)C channels are allocated to the high-frequency band, and
wherein C is a natural number, and a (0<α<1) is a rational number that makes αC a natural number.

18. The image processing method according to claim 2, wherein the octave convolution-based neural network is configured to use an L1 loss function and an edge loss function, wherein the L1 loss function is defined as:

$$L_1(\hat{y}, y) = \frac{1}{K}\sum_{k=1}^{K}\frac{1}{H_k W_k C_k}\|\hat{y}_k - y_k\|_1,$$

and
wherein the edge loss function is defined as:

$$L_E(\hat{y}, y) = \frac{1}{K}\sum_{k=1}^{K}\frac{1}{H_k W_k C_k}\|sobel(\hat{y}_k) - sobel(y_k)\|_2^2,$$

where K is a batch size, $C_k$ is a number of channels, $H_k$ is a number of channels, $W_k$ is a height of the high-frequency feature map, $W_k$ is a width of the high-frequency feature map, $y_k$ is a label, $\hat{y}_k$ is a predicted value, and sobel( ) is a sobel filter.

19. The transitory computer-readable medium according to claim 9, wherein the octave convolution-based neural network further comprises:
a link block configured to connect the plurality of octave encoder blocks and the plurality of octave decoder blocks; and
an edge decoder block configured to be connected to the link block and output an edge image for the received image, and
wherein the link block is configured to provide, to the edge decoder block and the octave decoder block, a low-frequency feature map for the image received from the plurality of octave encoder blocks,
wherein the octave convolution-based neural network is configured to use an L1 loss function and an edge loss function,
wherein the L1 loss function is defined as:

$$L_1(\hat{y}, y) = \frac{1}{K}\sum_{k=1}^{K}\frac{1}{H_k W_k C_k}\|\hat{y}_k - y_k\|_1,$$

and
wherein the edge loss function is defined as:

$$L_E(\hat{y}, y) = \frac{1}{K}\sum_{k=1}^{K}\frac{1}{H_k W_k C_k}\|sobel(\hat{y}_k) - sobel(y_k)\|_2^2,$$

where K is a batch size, $C_k$ is a number of channels, $H_k$ is a number of channels, $W_k$ is a height of the high-frequency feature map, $W_k$ is a width of the high-frequency feature map, $y_k$ is a label, $\vec{y}_k$ is a predicted value, and sobel( ) is a sobel filter.

20. The image processing device according to claim 11, wherein the octave convolution-based neural network is configured to use an L1 loss function and an edge loss function,
wherein the L1 loss function is defined as:

$$L_1(\hat{y}, y) = \frac{1}{K}\sum_{k=1}^{K}\frac{1}{H_k W_k C_k}\|\hat{y}_k - y_k\|_1,$$

and
wherein the edge loss function is defined as:

$$L_E(\hat{y}, y) = \frac{1}{K} \sum_{k=1}^{K} \frac{1}{H_k W_k C_k} \|sobel(\hat{y}_k) - sobel(y_k)\|_2^2,$$

where K is a batch size, $C_k$ is a number of channels, $H_k$ is a number of channels, $W_k$ is a height of the high-frequency feature map, $W_k$ is a width of the high-frequency feature map, $y_k$ is a label, ŷk is a predicted value, and sobel( ) is a sobel filter.

* * * * *